Aug. 28, 1934.  W. F. WATSON  1,971,470
FISHING REEL
Filed June 4, 1934

Inventor
W. F. Watson.

By Lacey & Lacey, Attorneys

Patented Aug. 28, 1934

1,971,470

UNITED STATES PATENT OFFICE 1,971,470

FISHING REEL

William F. Watson, Bradenton, Fla.

Application June 4, 1934, Serial No. 729,001

8 Claims. (Cl. 242—84.5)

The present invention relates to an improved fishing reel.

It is well known among fishermen that it is extremely difficult to cast a fishing line without tangling or snarling the line. These snarls are usually caused by the too rapid rotation of the spool of the reel. That is to say, the spool revolves at a greater speed than the line pays out from said spool, so that reverse rotation, with consequent snarling of the line, takes place. It is extremely difficult and sometimes impossible to clear these snarls and much time and patience is lost in attempting to do so. The result is that the pleasure ordinarily gained from a fishing expedition is materially reduced and the expense of maintenance of the equipment is increased to a considerable degree, as it is often necessary to replace the fishing line entirely after such snarling.

One object of the present invention is, therefore, to provide a fishing reel embodying means for adjusting the speed of the spool with respect to the speed of the line being paid out, so that reverse winding and snarling of the line will be avoided.

Another object of the invention is to provide a fishing reel, the spool of which carries a spring, which spring is adapted to transfer rotation to the brake disc employed so that a frictional connection between the spool and the brake disc will be provided.

A further object of the invention is to provide a device of this character having a brake disc provided with shoes which are adapted to frictionally engage a brake ring for controlling the speed of the spool connected with the disc.

A further object of the invention is to provide a fishing reel employing anti-backlash structure which may be readily incorporated into any fishing reel, it being understood that suitable adjustments may be made for adapting the structure to reels of different sizes and shapes, as well as to a level winding device.

A still further object of the invention is to provide a fishing reel wherein the brake shoes employed have an aggregate braking surface equal to substantially half the circumference of the brake ring so that effectual braking will be permitted.

Another object of the invention is to provide a fishing reel which is entirely automatic in operation, so that the fisherman will not be required to do any thumbing when casting the line. Furthermore, the device is adaptable for use by either right or left handed fishermen.

And a still further object of the invention is to provide a fishing reel which will be of simple construction and easy to operate.

Other and incidental objects of the invention, not specifically mentioned in the foregoing, will appear during the course of the following description.

The invention is illustrated in the drawing filed herewith, and wherein.

Figure 1:
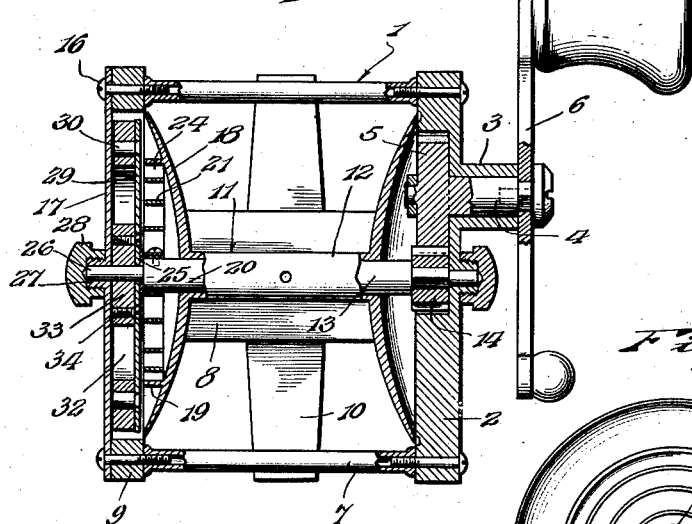
Figure 1 is a longitudinal sectional view of my improved fishing reel on the line 1—1 of Figure 2, looking in the direction indicated by the arrows.

Referring now more particularly to the accompanying drawing, wherein like numerals of reference designate similar parts throughout the several views, the numeral 1 indicates in general a reel frame which comprises an end wall 2 having a sleeve 3 thereon adapted to carry a stub shaft 4. Formed on the stub shaft is a gear 5. The usual handle 6 is carried on the stub shaft 4 and is adapted for manual rotation.

Tie rods 7, together with a base web 8, serve to connect the wall 2 with the brake ring 9 which will be described in full detail hereinafter. The usual mounting plate is shown at 10.

Mounted in the reel frame 1 axially thereof is a spool, indicated in general by the numeral 11. The spool comprises a hollow sleeve 12 having a spindle 13 keyed thereto, which spindle is provided with a pinion 14 meshing with the gear 5.

Figure 3:
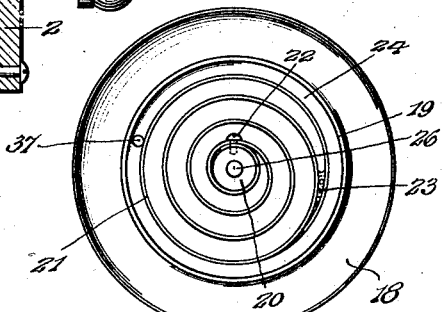
Figure 3 is a plan view of one end of the spool employed and showing the coiled spring in proper position thereon.
Figure 2:
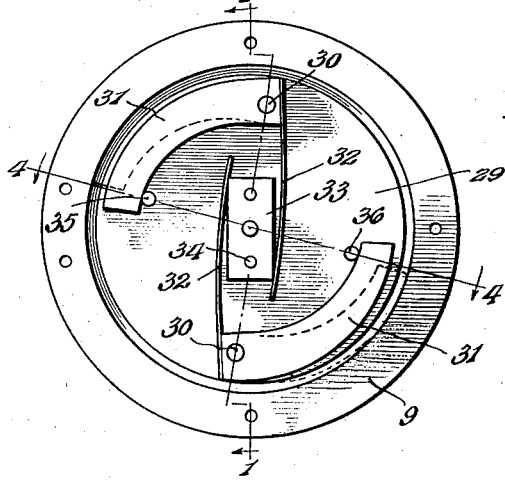
Figure 2 is a plan view of the end of the reel carrying the mechanism comprising my invention, with the cover plate removed.

In carrying my invention into effect, the ring 9, which is formed of hard rubber or other suitable material, is secured in place by means of screws 16 which also clamp a circular cover 17 in place. The spool 11 is provided at the end opposite the handle with a concave end flange 18. Secured to the base of the flange 18 concentrically thereof is an annular guide ring 19, the free circular edge of which terminates in the same plane with the rim of said flange 18. The spindle 13 projects past the flange 18, as shown at 20. Associated with the portion 20 is a coiled spring 21. By referring to Figure 3 of the drawing, it will be seen that the inner end of the coiled spring 21 is secured to the portion 20 by means of a screw 22, while the outer end of said spring is overlapped upon its adjacent circular portion, as shown at 23, to define a continuous circular outer surface for the spring. The end of the spring may be secured to the adjacent radial portion therebeneath by means of soldering, brazing, or in any other suitable manner. It will be seen that a circular raceway or track 24 is provided between the outer surface of the spring and the inner surface of the ring 19. Overlying the end face of the portion 20 is a spacing washer 25 which is carried on a reduced end portion 26 of the spindle 13, which end portion extends through the cover 17 and is carried in a journal 27. A cap nut 28 protects the end portion 26 of the spindle.

Overlying the concave end of the flange 18, the ring 19 and the spring 21, is a brake disc 29 which is formed of brass, or other suitable material, and is of a diameter equal substantially to the diameter of the flange 18, the rim of said disc terminating in closed spaced relation to the inner surface of the brake ring 9. Mounted on the disc diametrically thereof and near the edge thereof are pivot pins 30 and pivotally mounted on said pins are arcuate weighted brake shoes 31 which extend in opposite directions from a given diameter. Carried on the shoes 31 are flat leaf springs 32 which are slightly bowed inwardly throughout their lengths. As will be observed, the disc is adapted to rotate freely upon the end portion 26 of the spindle 13. Mounted on the disc at its axis is a rectangular block 33 which is adapted to be engaged by the springs 32. Rivets 34 serve to anchor the block to the face of the disc 29. As will be noted, the block is of a height equal to that of the shoes and is, of course, disposed on the same side of the disc.

Figure 4:
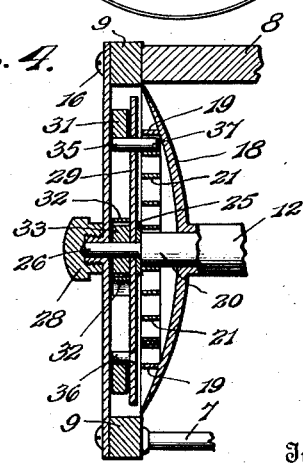
Figure 4 is a fragmentary sectional view on the line 4—4 of Figure 2, looking in the direction indicated by the arrows.

Mounted diametrically of the disc 29 and disposed between the corresponding free end portions of the shoes are stop pins 35 and 36. By referring to Figure 4 of the drawing, it will be seen that the stop pin 35 is projected through the wall of the disc 29 to define a friction pin 37 which is normally adapted to shift in the raceway or track 24 which is defined between the spring 21 and ring 19. The stop pin 35 also serves the function of limiting the shoes 31 against inward shifting movement. The stop pin 36 serves this purpose alone.

In operation, after the fishing line has been wound upon the sleeve 12 of the spool 11 and it is desired to cast the line, the casting operation is effected in the usual manner. As the line pays out from the spool, the amount of said line on the spool will decrease and the speed of rotation of the spool will correspondingly increase. However, as the speed of the spool increases, a frictional connection between the friction pin 37 and the spring 19 will be effected so that rotation will be transmitted from the spool to the disc. As the speed of the disc and spool increases, the centrifugal force will, obviously, increase so that the brake shoes 31 will be shifted on the pivot pins 30 outwardly against the tension of the leaf springs 32 for engaging the faces of said shoes against the inner or braking face of the ring 9 for retarding the speed of the disc. As previously explained, the friction pin 37 will frictionally engage the spring 19 so that said pin will be disposed in the raceway 24 in frictional engagement with the spring so that retarded movement of the disc will be transmitted to the spool for reducing the speed of rotation thereof and consequently permitting the line to pay out without becoming snarled on the spool. It should be understood that the frictional engagement between the pin 37 and the spring 19 is just enough so that when the one element, either the spool or the disc, is moving at a greater speed than the other, said frictional engagement between said pin and spring will serve to effectually synchronize their speeds. The springs 32 which bear against the block 33 will serve normally to urge the shoes away from the ring 9. However, the centrifugal force caused by rapid rotation of the disc 29, together with the weight of the shoes, will be sufficient to overcome the tension of the springs when the disc is revolved at a high speed.

Attention is also directed to the fact that the disc is freely rotatable about the end portion of the spindle and is connected with the spool only by the frictional engagement of the friction pin 37 and the spring 19. A very flexible yet efficient construction is, therefore, provided. It is also to be noted that, as each of the shoes is of a length equal to substantially one-fourth the circumference of the ring 9, and is disposed relatively near said ring, the braking action will be very effective.

The device may be manufactured easily and cheaply so that it could be sold in large numbers. It is thought that the construction and operation of the device will be clearly understood from the foregoing description.

Having thus described the invention, what I claim is:

1. A fishing reel including a reel frame, a spool rotatable therein, a brake ring carried by the frame, a disc carried by the frame and independently rotatable with respect to the spool, means connecting the disc with the spool and means carried on the disc and engageable with the brake ring for regulating the speed of the spool.

2. A fishing reel including a reel frame, a spool rotatable therein, means carried by the frame for rotating the spool, a spindle mounting the spool in the frame, a brake ring carried by the frame, a disc rotatable upon the spindle, means frictionally connecting the disc with the spool, and brake shoes carried by the disc and shiftable by the centrifugal force exerted by the rotating disc to engage the brake ring for controlling the speed of the spool.

3. A fishing reel including a reel frame, a spool carried therein, manually operable means for rotating the spool within the frame, said spool being provided with a sleeve and an end flange, a guide ring carried on the flange, a spindle extending through the sleeve and mounting the spool within the frame, a coiled spring carried by the spindle and having a continuous outer surface, a disc freely rotatable on the spindle axially of the end flange, a friction pin carried by the disc frictionally connecting the spring and disc whereby rotation of the spool will be transmitted to the disc, a brake ring on the frame, and brake shoes carried by the disc and shiftable for engagement with the brake ring by the centrifugal force exerted by the rotating disc for retarding the speed of the spool.

4. A fishing reel including a reel frame, a spool rotatable therein, means for rotating the spool, a spindle carried by the frame and mounting the spool therein, said spool having an end flange, a guide ring carried on the end flange, a coiled spring connected with the spindle and provided with a circular continuous outer rim, a disc rotatable on the spindle in concentric relation to the spring and end flange, a friction pin carried by the disc and engageable between the spring and the circular rim for providing a frictional connection between the spool and the disc, a brake ring, and arcuate brake shoes pivotally mounted on the disc and shiftable by centrifugal force exerted by the rotation of the disc into engagement with the brake ring for controlling the speed of the spool.

5. A fishing reel including a reel frame, a spool rotatable therein, means for rotating the spool, a spindle mounting the spool in the frame, said spool having an end flange, a guide ring mounted on the end flange, said spindle having a reduced end portion, a coiled spring carried on the spindle within the confines of the guide ring and having a continuous circular outer rim cooperating with the ring to define a raceway, a disc freely rotatable on the reduced end portion of the spindle, a friction pin carried by the disc and engageable with the spring within the raceway for providing a frictional connection between the spool and the disc, a brake ring, and arcuate weighted brake shoes carried by the disc and engageable by rotation of the disc with the brake ring for retarding the speed of the spool.

6. A fishing reel including a reel frame, a spool rotatable therein, a spindle mounting the spool, manually operable means for rotating the spool, said spindle having a reduced end portion, a brake ring, a disc freely rotatable on the reduced end portion of the spindle, means for frictionally connecting the disc and spool, brake shoes carried on the disc, a rectangular block carried on the disc axially thereof, springs carried by the brake shoes and adapted for engagement at opposite points on the block, said springs limiting outward movement of the shoes, and a cover closing the end of the frame, said disc being rotatable by the spool for shifting the shoes against the tension of the springs and engaging said shoes with the brake ring whereby rotation of the spool will be controlled.

7. A fishing reel including a reel frame, a spool rotatable therein, a brake ring carried by the frame, and means carried by the spool and rotatable independently of said frame and spool and frictionally connected with the spool, said means being engageable with the brake ring for controlling the speed of the spool.

8. A fishing reel including a reel frame, a spool rotatable therein, manually operable means for rotating the spool, said spool having a concave end flange, a guide ring mounted axially in the concave end flange, a spindle extending through the spool, a coiled spring carried by the spindle and having a continuous circular outer rim cooperating with the ring to define a raceway, said spindle being provided with a reduced end portion, a disc freely rotatable on said reduced end portion, a block carried by the disc axially thereof, stop pins carried by the disc, one of said stop pins being projected into the raceway to define a friction pin for frictionally connecting the spool with the disc, arcuate weighted brake shoes carried on the disc, a brake ring carried by the frame, springs carried by the brake shoes and adapted to impinge on the block at opposite points thereon, said springs retaining the shoes against outward displacement and said pins limiting the shoes against inward displacement, and a cover overlying the disc and closing the end of the frame, said disc being rotatable by the spool for shifting the shoes against the tension of the springs to engage the ring for controlling the speed of the spool.

WILLIAM F. WATSON. [L. S.]